United States Patent [19]

Ohsawa

[11] Patent Number: 5,334,896

[45] Date of Patent: Aug. 2, 1994

[54] SPINDLE MOTOR FOR MAGNETIC DISK DEVICES

[75] Inventor: Masahiro Ohsawa, Machida, Japan

[73] Assignee: Fuji Electric Co., Ltd., Japan

[21] Appl. No.: 936,501

[22] Filed: Aug. 28, 1992

[30] Foreign Application Priority Data

Aug. 30, 1991 [JP] Japan .................. 3-219635

[51] Int. Cl.$^5$ .................. H02K 11/00; H02K 1/27; G11B 17/04
[52] U.S. Cl. .................. 310/67 R; 310/267; 360/98.07
[58] Field of Search .................. 310/67 R, 156, 181, 310/267; 360/98.07, 98.08, 99.04, 99.05, 99.11, 99.12

[56] References Cited

U.S. PATENT DOCUMENTS

| | | | |
|---|---|---|---|
| 4,779,165 | 10/1988 | Elsaesser et al. | 360/97 |
| 4,788,464 | 11/1988 | Nishikawa et al. | 310/268 |
| 4,874,976 | 10/1989 | Ohsawa et al. | 310/268 |
| 4,949,000 | 8/1990 | Petersen | 310/179 |
| 4,965,476 | 10/1990 | Lin | 310/51 |
| 5,008,573 | 4/1991 | Beppu et al. | 310/67 R |
| 5,038,240 | 8/1991 | Isomura | 360/99.08 |
| 5,047,677 | 9/1991 | Mineta et al. | 310/67 R |
| 5,157,295 | 10/1992 | Stefansky et al. | 310/90 |

Primary Examiner—Emanuel T. Voeltz
Assistant Examiner—D. R. Haszko
Attorney, Agent, or Firm—Parkhurst, Wendel & Rossi

[57] ABSTRACT

The invention provides a spindle motor for magnetic disk devices capable of coping with small magnetic disks, in which the leaking magnetic flux in the motor section does not adversely affect the magnetic head. The spindle motor consists of a stator, a magnetic disk mounting hub axially supported on a frame of the stator, a bowl-like rotor yoke protruding from the base of the hub in the radial direction and covering the top and circumference of the stator, and a rotor magnet fitted over the inner circumference of the rotor yoke in a position opposite to the magnetic pole of the stator. A clearance space comprising is provided between a mounting seat of the magnetic disk and the top of the rotor yoke. The outer diameter of the hub base is also smaller than the information-recording region of the magnetic disk, and the rotor yoke is fitted as a magnetic body on the hub, which is made from the same material as the substrate of the magnetic disk.

3 Claims, 1 Drawing Sheet

SPINDLE MOTOR FOR MAGNETIC DISK DEVICES

FIELD OF THE INVENTION

The present invention relates to a spindle motor for magnetic disk devices used as information storing devices in computer systems.

BACKGROUND OF THE INVENTION

A conventional construction of a first-described spindle motor for magnetic disk devices (an outer rotor-type DC brushless motor) is shown in FIG. 2 as including a stator 1; a magnetic disk-mounting hub 2 axially supported on a frame 3 of the stator 1 via a bearing 4; a rotor magnet 5 (filed permanent magnet) fitted on the inner side of the outer circumference of the hub 2 in a position opposite to a magnetic pole of the stator 1; a clamp 6 to secure a magnetic disk 7 mounted on the hub 2; and a screw 8 to secure the clamp 6. The hub 2 is made of aluminum, which is also used for the substrate of the magnetic disk 7, and has a bowl-like yoke 2a protruding from its base in the radial direction, to which the magnetic disk 7 is mounted using the flat top of the yoke 2a as a seating face. A magnetic head 9, supported on a support member 10, is provided to write to and read information items or data from the magnetic disk.

A magnetic disk device of the construction shown in FIG. 2 is commonly known. In such a conventional device, the magnetic disk 7 is mounted on a spindle motor to rotate the disk. Furthermore, the magnetic head 9 is scanned in this condition along tracks on the information recording face of the magnetic disk 7, and the magnetic head 9 is moved in the radial direction by a head carrier (not shown in the figure) to access a selected track and write in and read out information items.

The spindle motor with a conventional construction as described above has a number of problems. For example, when the magnetic disk 7 is mounted on the spindle motor, the inner circumferential area of the magnetic disk 7 is superposed with the top of the yoke 2a in the hub 2. Therefore, the area that the magnetic head 9 can access, or the area where information can be written in or read out, is limited of its own accord to the area outside the circumference of the yoke 2a. Moreover, the specification for the spindle motor is determined from the motor starting torque, rated output, and measures to prevent off-tracks caused by shaft run-out, and the reduction of the outline dimensions of the motor from the design aspect is limited. For this reason, motors with a conventional construction are almost incapable of coping with magnetic disks with small diameters (1.8 inches or less) for example.

In addition, when the magnetic head 9 moves toward the inner circumference of the magnetic disk 7 approaching the hub 2 of the spindle motor, a motor with a conventional construction may suffer a magnetic flux leak from the rotor magnet 5 or the stator 1 which may cause noise effecting the magnetic head 9, thereby leading to a risk of errors in writing in and reading out information. Means to prevent influence of the magnetic flux leaking from the spindle motor include enclosing the motor by using a magnetic body such as iron to magnetically shield the entire hub from the magnetic disk. This construction, however, may cause another problem since, when ambient temperatures changes, the difference in the thermal expansion of the magnetic disk substrate (usually made of aluminum) and the hub may cause mechanical distortion in the magnetic disk.

The present invention has been made in the light of the above problems, and is intended to provide a spindle motor for magnetic disk devices which can eliminate the above-mentioned problems and is capable of coping with a small magnetic disk, in which magnetic flux leakage from the motor does not adversely affect the magnetic head.

SUMMARY OF THE INVENTION

In order to solve the above problems, a spindle motor according to the present invention has been provided that includes a stator, a hub for the magnetic disk device axially supported on the frame of the stator, a bowl-like rotor yoke protruding from the base of the hub in the radial direction and covering the top and circumference of the stator, and a rotor magnet fitted over the inner circumference of the rotor yoke in a position opposite to the magnetic pole of the stator, in which a difference in level is provided between the seat of the magnetic disk and the top of the rotor yoke. With the above construction, the outer diameter of the hub base is smaller than the information-recording region of the magnetic disk, and a rotor yoke is fitted as a magnetic body to the base of the hub made of the same material as the substrate of the magnetic disk.

With the above construction, since a space is secured so that the magnetic head can move to a position between the lower face of the magnetic disk and the rotor yoke, and gain access to the inner circumference of the information-recording region in the magnetic disk. In addition, because the magnetic flux leaking from the motor is magnetically shielded by the rotor yoke which is a magnetic body, there is no fear of magnetic flux transmitting noise to the magnetic head. Furthermore, when the hub is made from the same material as the magnetic disk substrate (such as, for example, when the magnetic disk substrate and the hub are both made of aluminum), there is no difference in the thermal expansion experienced by the two parts, and the magnetic disk can be retained stably without being impeded even by changes in the ambient temperature.

DETAILED DESCRIPTION OF THE PREFERRED EMBODIMENT

Figure 1:
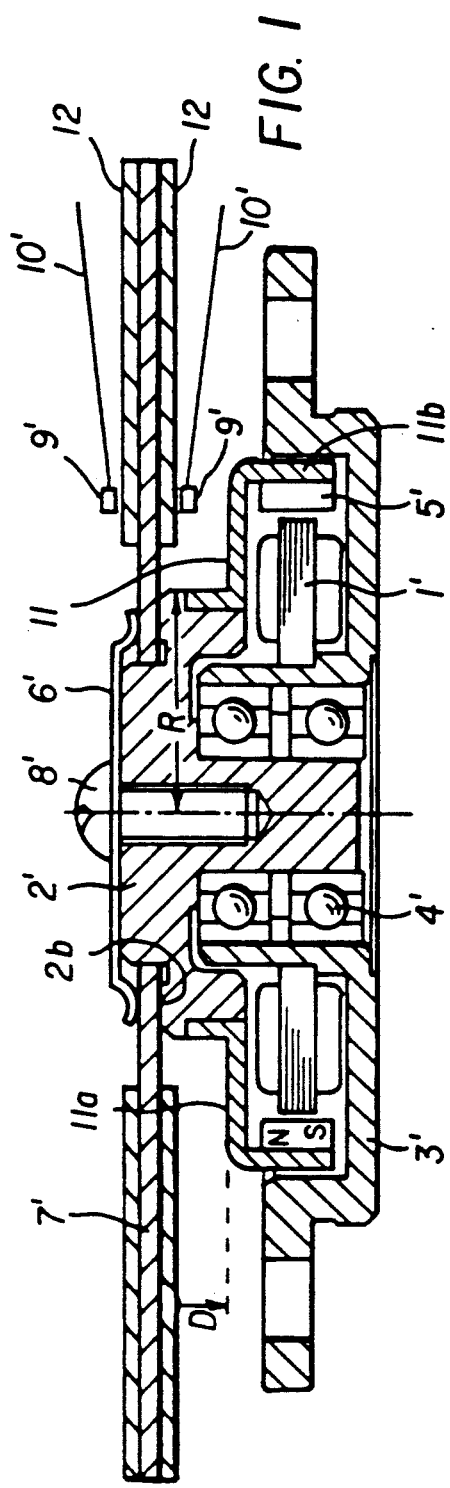
FIG. 1 illustrates a spindle motor in accordance with the present invention.
Figure 2:
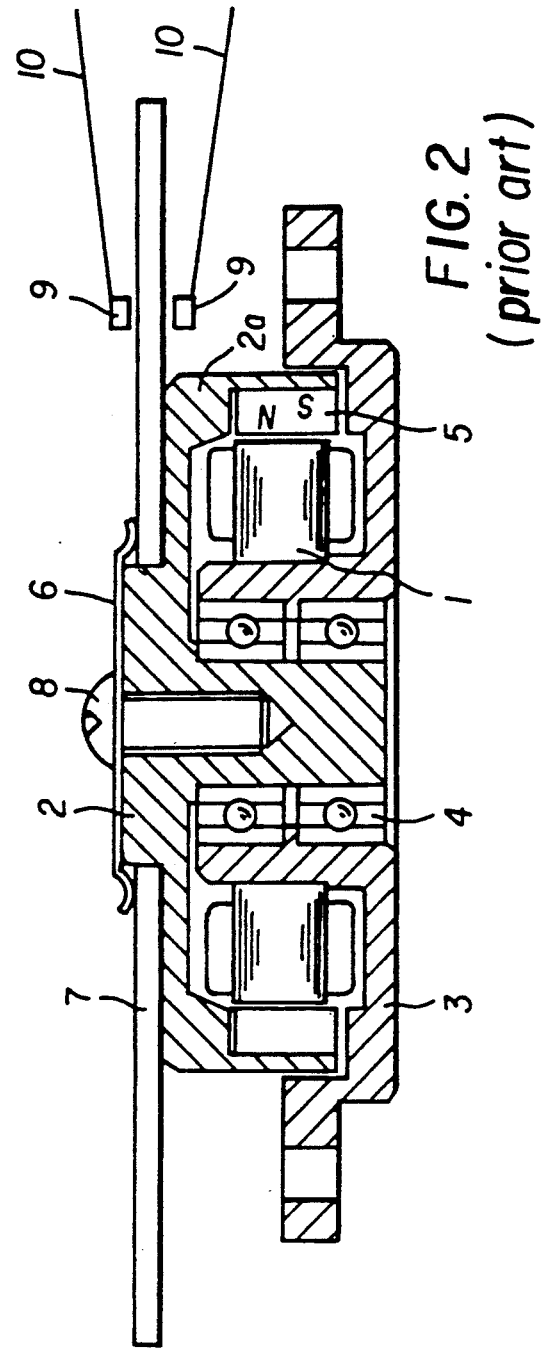
FIG. 2 illustrates a conventional spindle motor construction.

The invention will now be described with reference to FIG. 1, in which like components to those illustrated in FIG. 2 have been given the same reference numeral with prime (') notations. In FIG. 1, a hub 2' is axially supported on a frame 3' of a stator 1' via a bearing 4'. The hub 2' is made of aluminum, the same material which is used for the substrate (aluminum) of the magnetic disk 7'. The hub outer diameter R is made smaller than the inner circumference of the information-recording region of the magnetic disk 7', and a seat 2b to install the magnetic disk 7' is formed at the middle step of the contact face. In addition, a separate rotor yoke 11, made of a magnetic material (iron, for example), is fitted and coupled coaxially to the hub 2' at the base below the seat 2b. The rotor yoke 11 is formed in a bowl-like form that protrudes from the hub 2' in the radial direction and covers the top and the outer circumference of the stator 1', the level difference D thereby assuring a movement path for the magnetic head 9' that is formed between a top section 11a and the seat 2b of the hub 2'. The rotor magnet 5' is fitted in a position opposite to the magnetic pole face of the stator 1' on the inner circumference of the outer cylindrical part 11b.

According to the above construction, since a clearance is secured corresponding to the level difference D between the lower face of the magnetic disk 7' and the rotor yoke 11' coupled with the hub 2'. Therefore, the magnetic head 9' can freely enter into and leave the clearance without mechanical interference from the rotor yoke 11' and, as a result, can access the information-recording face 12 on the magnetic disk 7'. Any leaking magnetic flux caused by the energizing of the coils of the rotor magnet 5' or the stator 1' will not adversely affect the magnetic head 9' by, for example, noise mixing because the rotor yoke 11, being a magnetic body, acts as magnetic shielding. Also, because the hub 2' itself is made of the same material as the substrate, there is no fear that the magnetic disk 7' will be distorted as a result of the difference in thermal expansion caused by changes in the ambient temperature.

A spindle motor for magnetic disk devices according to the present invention constructed as described above has the following effects:

(1) since a clearance is secured between the magnetic disk and the motor, thereby allowing for free movement of the magnetic head, so that the magnetic head can access the information-recording region without being restricted by the motor outline dimensions, and can, as a result, write in and read out information items;

(2) because the rotor yoke, which is made of a magnetic material acts as a magnetic shield, the leaking magnetic flux on the motor side will not adversely affect the magnetic head;

(3) because the hub and the rotor yoke are constructed as separate parts, processing the parts is easier, and by selecting the same material for both the hub and magnetic disk substrate, the problem of a thermal expansion difference distorting the magnetic disk can be eliminated; and (4) the motor section can be designed freely by applying motor performance such as the starting torque and the rated output to specification without being restricted by the diameter of the magnetic disk or the dimensions of the information-recording region.

The invention has been described with reference to certain preferred embodiments thereof. It will be understood, however, that modifications and variations are possible within the scope of the appended claims.

What is claimed is:

1. A spindle motor for magnetic disk devices comprising: a stator; a hub axially supported on a frame of a stator; a bowl-like rotor yoke protruding from a base of the hub in a radial direction and covering a top and circumference of the stator; and a rotor magnet fitted to an inner circumference of the rotor yoke in a position opposite to a magnetic pole of the stator; a magnetic disk seated on the hub; wherein a clearance is provided between the magnetic disk seated on the hub and a top of the rotor yoke; wherein the rotor yoke is a magnetic body and the hub is made of an identical material as a substrate of the magnetic disk.

2. A spindle motor for magnetic disk drives, as claimed in claim 1, wherein the clearance is sufficient to permit a magnetic head to be positioned between the magnetic disk and the top of the rotor yoke.

3. A spindle motor for magnetic disk drives, as claimed in claim 1, wherein the information recording region of the magnetic disk extends over the top of the rotor yoke.

* * * * *